(12) United States Patent
Oaks

(10) Patent No.: US 9,737,131 B1
(45) Date of Patent: Aug. 22, 2017

(54) EYEGLASSES HOLDING CLIP

(71) Applicant: Dale Oaks, Chicago, IL (US)

(72) Inventor: Dale Oaks, Chicago, IL (US)

( * ) Notice: Subject to any disclaimer, the term of this patent is extended or adjusted under 35 U.S.C. 154(b) by 212 days.

(21) Appl. No.: 14/728,174

(22) Filed: Jun. 2, 2015

(51) Int. Cl.
A45F 5/02 (2006.01)
A44B 99/00 (2010.01)
G02C 3/00 (2006.01)
G02C 11/00 (2006.01)
G02C 3/04 (2006.01)

(52) U.S. Cl.
CPC ............. *A45F 5/02* (2013.01); *A44B 99/00* (2013.01); *G02C 3/00* (2013.01); *G02C 3/04* (2013.01); *G02C 11/00* (2013.01); *A45F 2200/0541* (2013.01); *Y10T 24/1371* (2015.01)

(58) Field of Classification Search
CPC ............. A45F 5/02; A44B 99/00; G02C 3/00
See application file for complete search history.

(56) References Cited

U.S. PATENT DOCUMENTS

| 3,210,814 | A | 10/1965 | Wolf |
| 5,235,727 | A | 8/1993 | McCloskey |
| 5,408,728 | A | 4/1995 | Wisniewski |
| 6,802,604 | B2 | 10/2004 | McCormick |
| 7,200,897 | B2 | 4/2007 | Silvestro |
| 7,553,018 | B1 * | 6/2009 | Riazi .............. A45F 5/02 24/3.3 |
| 7,850,302 | B1 * | 12/2010 | Riazi .............. A45F 5/02 24/3.3 |
| D649,581 | S | 11/2011 | Foulger |
| 8,210,675 | B1 | 7/2012 | Leshe |
| 2007/0006425 | A1 | 1/2007 | Woodbury |
| 2011/0119871 | A1 | 5/2011 | Chauvin |

FOREIGN PATENT DOCUMENTS

| EP | 2012172 | 1/2009 |
| WO | WO0030488 | 6/2000 |

* cited by examiner

Primary Examiner — Robert J Sandy
Assistant Examiner — Louis Mercado

(57) ABSTRACT

The eye glasses holding clip is a device for the storage of eye glasses. The device is adapted to be attached to, and worn with, eye glasses. When the eye glasses are removed, the eye glasses holding clip allows the user to attach, carry, and store the eye glasses on an article of clothing or other object. The eye glasses holding clip comprises a rectangular tube, a hinge, and a clip.

3 Claims, 5 Drawing Sheets

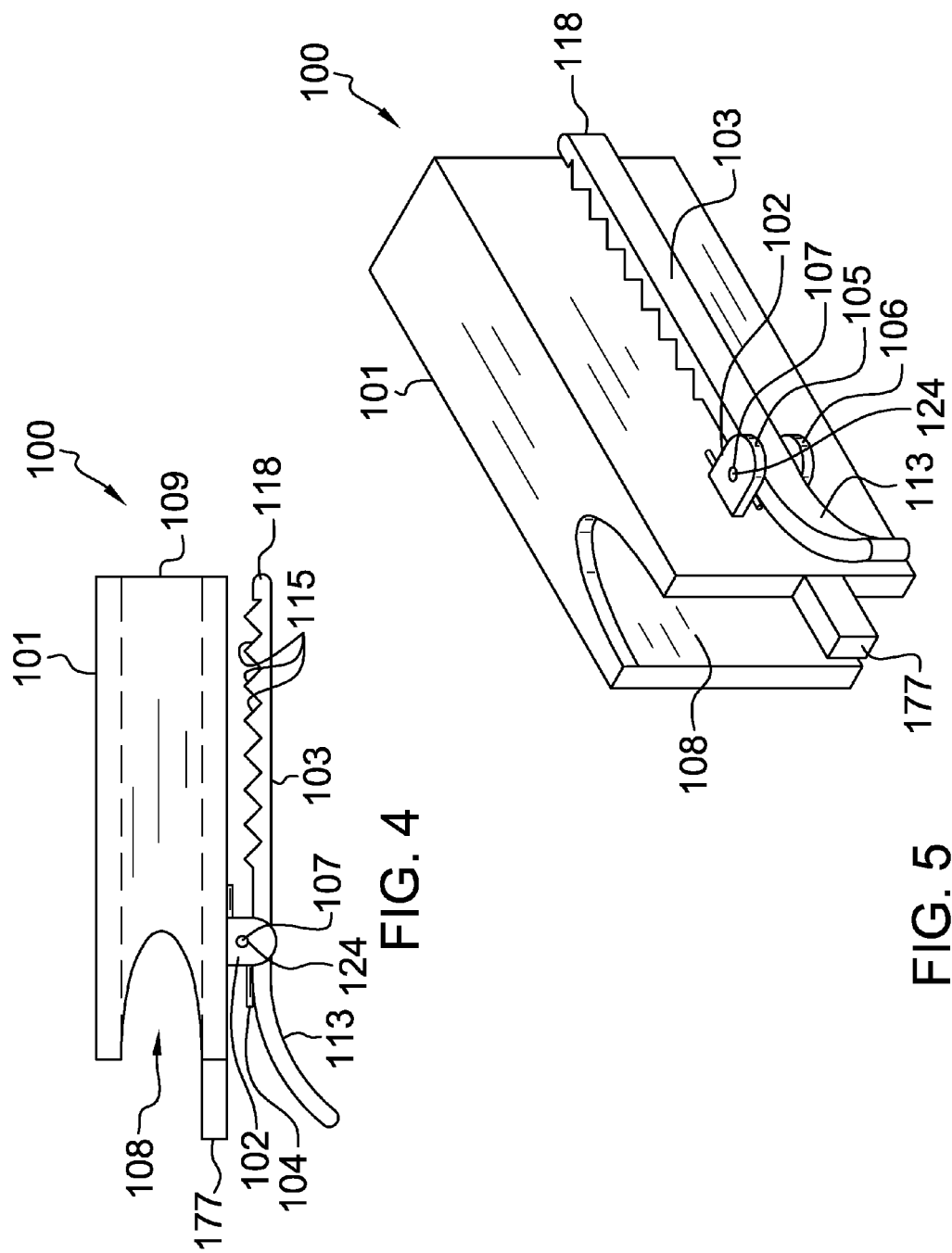

EYEGLASSES HOLDING CLIP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of eyeglasses holders and ornamentation for eyeglasses, more specifically, a clip configured for use with eyeglasses.

SUMMARY OF INVENTION

The eyeglasses holding clip is a device for the storage of eye glasses. The device is adapted to be attached to, and worn with, eyeglasses or sunglasses. When the eyeglasses are removed, the eye glasses holding clip allows the user to attach, carry, and store the eye glasses on an article of clothing or other object.

These together with additional objects, features and advantages of the eyeglasses holding clip will be readily apparent to those of ordinary skill in the art upon reading the following detailed description of the presently preferred, but nonetheless illustrative, embodiments when taken in conjunction with the accompanying drawings.

In this respect, before explaining the current embodiments of the eyeglasses holding clip in detail, it is to be understood that the eyeglasses holding clip is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the eyeglasses holding clip.

It is therefore important that the claims be regarded as including such equivalent construction insofar as they do not depart from the spirit and scope of the eyeglasses holding clip. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 4 is a top view of an embodiment of the disclosure.

FIG. 5 is a perspective view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
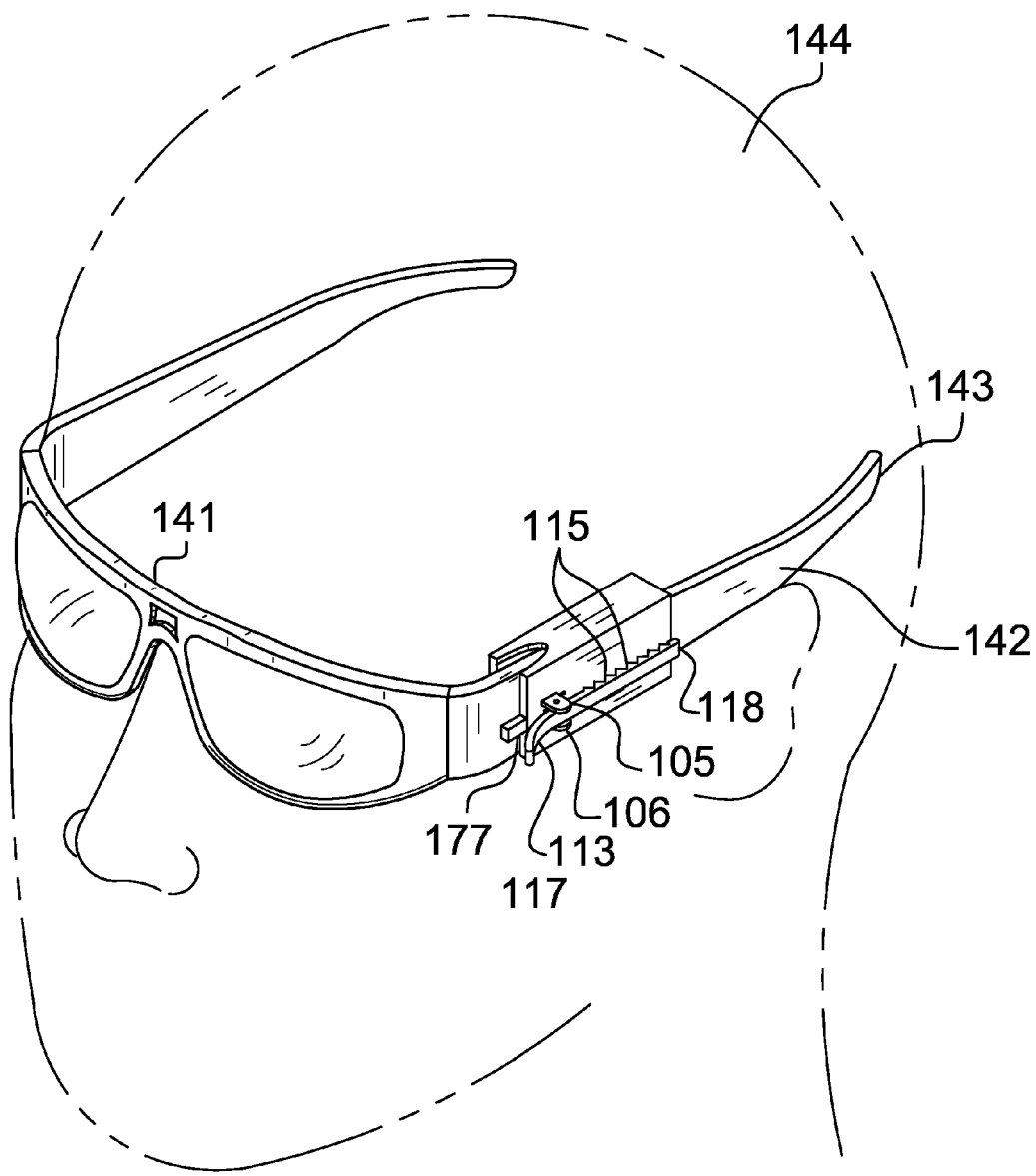
FIG. 1 is an in-use view of an embodiment of the disclosure.
Figure 2:
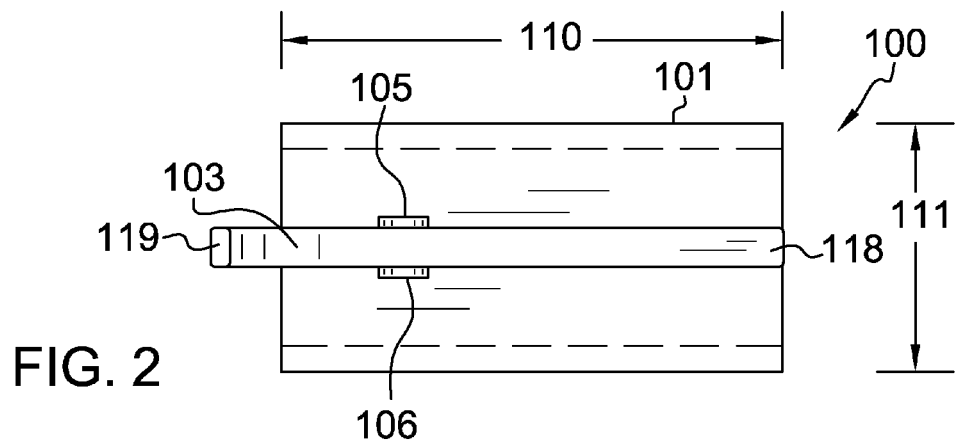
FIG. 2 is a side view of an embodiment of the disclosure.
Figure 3:
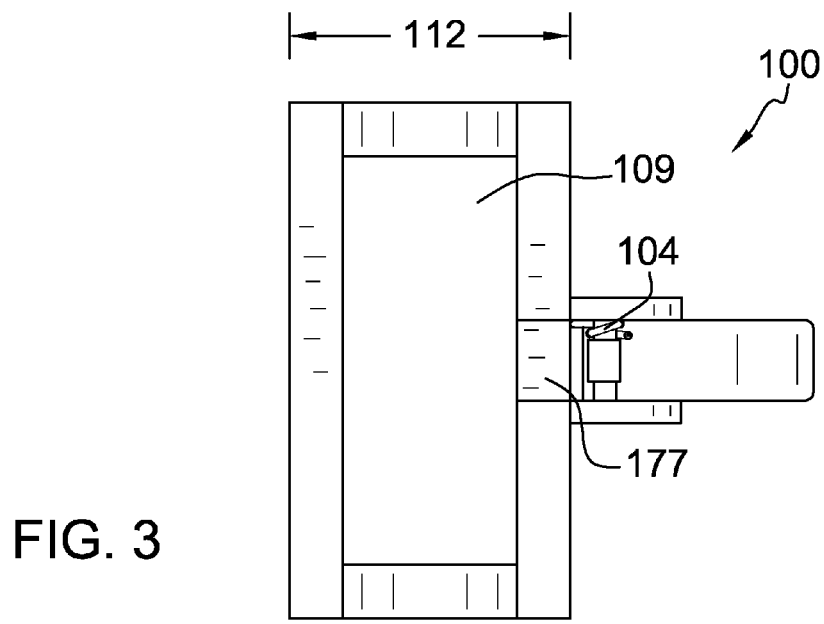
FIG. 3 is a front view of an embodiment of the disclosure.
Figure 6:
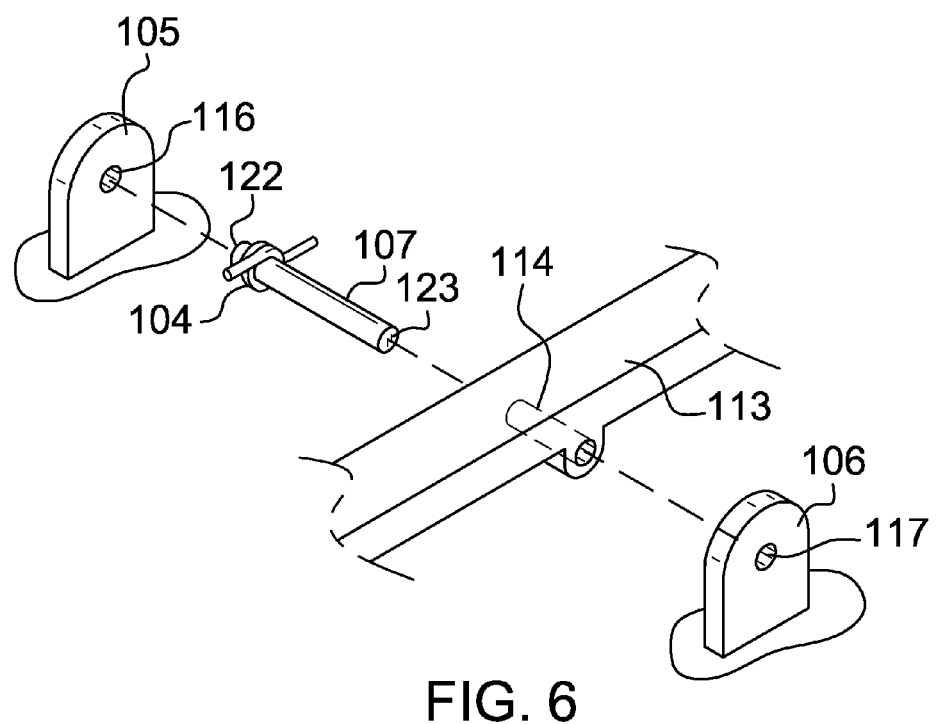
FIG. 6 is an exploded view of an embodiment of the disclosure.
Figure 7:
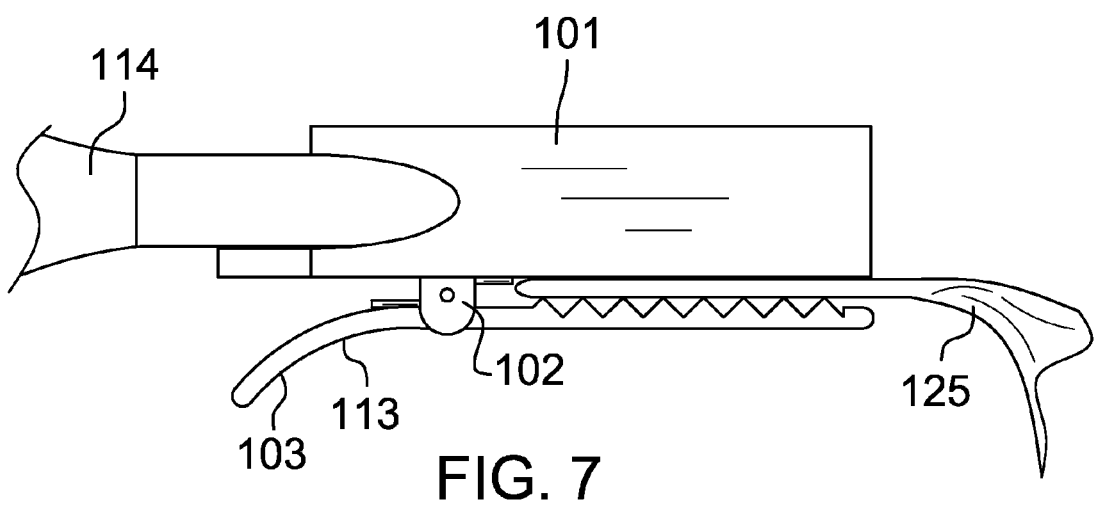
FIG. 7 is an in-use view of an embodiment of the disclosure.

Detailed reference will now be made to a first potential embodiment of the disclosure, which is illustrated in FIGS. 1 through 7. The eye glasses holding clip 100 (hereinafter invention) comprises a rectangular tube 101, a hinge 102, and a clip 103.

The rectangular tube 101 is a tube that is in the shape of a rectangular block. The rectangular tube 101 is further defined with a first open end 108, a second open end 109, a length 110, width 111, and breadth 112. The first open end 108 and the second open end 109 are adapted to receive and securely hold the rectangular tube 101 to the temple 142 of a pair of eye glasses 141. The rectangular tube 101 is designed to have as thin a span in the breadth 112 direction as possible to facilitate wearing the eye glasses 141 while the invention 100 is attached.

The clip 103 is a device that fastens the invention 100 to an article of clothing, fabric, or some other object. The clip 103 comprises a curved bar 113, a third mounting hole 114, and an optional plurality of teeth 115.

The curved bar 113 is a curved bar that runs along the side of the rectangular tube 101 in a direction parallel to the direction of the temple 142 of the eye glasses 141. At the hinge 102 pivot point 124 the curved bar 113 curves away from the side of the rectangular tube 101 in a direction away from the wearer's head 144. The clip 103 is further defined with a first end 118 and a second end 119. From the first end 118 of the clip 103 to the hinge 102 pivot point 124 the curved bar 113 lays flat against the rectangular tube 101. At the hinge 102 pivot point 124 the curved bar 113 curves away from the side of the rectangular tube 101 in a direction away from the wearer's head 144 to the second end 119 of the curved bar 113. The second end 119 of the curved bar 113 acts as a lever that rotates the first end 118 of curved bar 113 away from the rectangular tube 101.

A lever stop 177 extends away from the first open end 108 of the rectangular tube 101. The lever stop 177 prevents over rotation of the curved bar 113 when actuating the clip 103. The first end 118 of the clip 103 does not extend beyond the rectangular tube 101.

The third mounting hole 114 is a hole that is formed through the width 111 of the clip 103. The purpose of the third mounting hole 114 is to receive a pivot pin 107 which connects the clip 103 to the hinge 102. The third mounting hole 114 is sized to receive the pivot pin 107.

The purpose of the optional plurality of teeth 115 is to create a serrated gripping surface that provides many small gripping points when the clip 103 is used to attach the invention 100 to clothing or other objects. When provided, the optional plurality of teeth 115 are positioned so that the optional plurality of teeth 115 face the surface of the rectangular tube 101.

The hinge 102 further comprises a spring 104, a first mount 105, a second mount 106 and the pivot pin 107. The spring 104 is a coiled torsion spring. The coil of the spring 104 is a helical coil.

The first mount 105 is a flat rectangular projection that is attached to the rectangular tube 101 such that it projects perpendicularly away from the rectangular tube 101 in a direction away from the wear's head 144. The second mount 106 is a flat rectangular projection that is attached to the rectangular tube 101 such that it projects perpendicularly away from the rectangular tube 101 in a direction away from the wear's head 144. The first mount 105 and the second mount 106 are parallel to each other. The first mounting hole 116 is formed in the first mount 105. The second mounting hole 117 is formed in the second mount 106. The first mount 105 and the second mount 106 are formed to be identical.

The first mounting hole 116 and the second mounting hole 117 are sized to receive the pivot pin 107 and are aligned such that when the pivot pin 107 is inserted through the first mounting hole 116, the second mounting hole 117 and the third mounting hole 114, the clip 103 will rotate freely around the pivot pin 107. The pivot pin 107 is a shaft that is used to attach the clip 103 to the hinge 102 and that acts as the pivot point 124 of the hinge 102 around which the clip 103 will rotate. The pivot pin 107 is further defined with a fifth end 122 and a sixth end 123.

The rectangular tube 101, first mount 105 and second mount 106 can be made of molded plastic. Suitable plastics include, but are not limited to, polyethylene and polycarbonate. The clip 103, spring 104, and the pivot pin 107 are commercially available. Alternatively, the clip 103 may be made of molded plastic or metal. Suitable plastics include, but are not limited to, polyethylene and polycarbonate. Suitable metal includes, but is not limited to, aluminum.

To assemble the invention 100, the spring 104 is placed over the fifth end 122 of the pivot pin 107. The sixth end 123 of the pivot pin 107 is inserted through third mounting hole 114 into the second mounting hole 117. The fifth end 122 of the pivot pin 107 is then inserted into first mounting hole 116. If desired, the fifth end 122 of the pivot pin 107 and the sixth end 123 of the pivot pin 107 can be secured to the first mounting hole 116 and the second mounting hole 117 respectively by gluing or brazing.

To use the invention 100, the temple tip 143 of the temple 142 is inserted into the first open end 108 of the rectangular tube 101 until it exits the second open end 109 of the rectangular tube 101. The eyeglasses 141 are worn normally. To store the eyeglasses 141, the second end 119 of the curved bar 113 is pushed towards the rectangular tube 101 and the rectangular tube 101 is clipped on an article of clothing 145.

The following definitions were used in this disclosure.

Eyeglasses: As used in this disclosure, eyeglasses are a pair of lenses held in a frame that are worn over the eyes. Eyeglasses are used to help with vision.

Tube: As used in this disclosure, a tube is a hollow device with a first open end and a second open end that is used for transporting liquids and gasses.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A holding clip comprising:
a rectangular tube, a hinge, and a clip;
wherein the holding clip is adapted for use with eyeglasses;
wherein the holding clip is adapted to be attached to the eyeglasses;
wherein the holding clip is adapted to attach the eyeglasses to an object;
wherein the rectangular tube is in a shape of a hollow rectangular block with a first open end and a second open end;
wherein the rectangular tube is further defined with a length, width, and breadth;
wherein the first open end and the second open end are adapted to receive and secure the rectangular tube to a temple of the eyeglasses;
wherein the clip fastens the holding clip to an article of clothing;
wherein the clip comprises a curved bar and a third mounting hole;
wherein the curved bar is a curved shaft that runs along a side of the rectangular tube in a direction parallel to a direction of a temple of the eyeglasses;
wherein the curved bar curves away from the side of the rectangular tube and is adapted to be in a direction away from a head;
wherein the clip is further defined with a first end and a second end;
wherein the curved bar lays flat against the rectangular tube from the first end of the clip to the hinge;
wherein the curved bar curves away from the side of the rectangular tube and is adapted to be in a direction away from the head from the hinge to the second end of the curved bar;
wherein the first end of the clip does not extend beyond the rectangular tube;

wherein the third mounting hole is a hole that is formed through a width of the clip;

wherein the hinge further comprises a spring, a first mount, a second mount and a pivot pin;

wherein the first mount is a rectangular projection that is attached to the rectangular tube such that it projects perpendicularly away from the rectangular tube and is adapted to be in a direction away from the head;

wherein the second mount is a flat rectangular projection that is attached to the rectangular tube such that it projects perpendicularly away from the rectangular tube and is adapted to be in a direction away from the head;

wherein the first mount and the second mount are parallel to each other;

wherein a first mounting hole is formed in the first mount;

wherein a second mounting hole is formed in the second mount;

wherein the first mount and the second mount are identical;

wherein the first mounting hole is sized to receive the pivot pin;

wherein the pivot pin is used to attach the clip to the hinge; wherein the clip is connected to the hinge by inserting the pivot pin into the third mounting hole;

wherein the pivot pin is further defined as a shaft;

wherein the pivot pin acts as a pivot point of the hinge;

wherein the first mounting hole, the second mounting hole and the third mounting hole are aligned such that the clip will rotate freely around the pivot pin;

wherein the pivot pin is further defined with a fifth end and a sixth end;

wherein the second end of the curved bar acts as a lever that rotates the first end of curved bar away from the rectangular tube;

wherein the spring is placed over the fifth end of the pivot pin;

wherein the sixth end of the pivot pin is inserted through the third mounting hole into the second mounting hole;

the fifth end of the pivot pin is inserted into first mounting hole;

wherein the fifth end of the pivot pin and the sixth end of the pivot pin are secured to the first mounting hole and the second mounting hole;

wherein a lever stop extends away from the first open end of the rectangular tube;

wherein the lever stop prevents over rotation of the curved bar when actuating the clip.

2. The holding clip according to claim 1 wherein the clip is further defined as including a plurality of teeth.

3. The holding clip according to claim 2 wherein the plurality of teeth face a surface of the rectangular tube.

* * * * *